United States Patent [19]
Plochocka et al.

[11] Patent Number: 5,635,568
[45] Date of Patent: Jun. 3, 1997

[54] REACTIVE EXTRUSION PROCESS FOR MAKING MIXED SALTS OF POLYMERS CONTAINING AN ANHYDRIDE, ACID OR ESTER SIDE GROUPS

[75] Inventors: Krystyna Plochocka, Scotch Plains; Rajiv Ginde; Jui-Chang Chuang, both of Wayne; William E. Prosise, Ramsey, all of N.J.

[73] Assignee: ISP Investments Inc., Wilmington, Del.

[21] Appl. No.: 516,029

[22] Filed: Aug. 17, 1995

[51] Int. Cl.$^6$ ............................................. C08F 8/42
[52] U.S. Cl. .................... 525/362; 525/327.8; 525/363; 525/367
[58] Field of Search ..................... 525/367, 362, 525/363

[56] References Cited

U.S. PATENT DOCUMENTS

| | | | |
|---|---|---|---|
| 3,981,836 | 9/1976 | Pangle, Jr. et al. | 525/369 |
| 5,003,012 | 3/1991 | Chamberlain et al. | 525/367 |

*Primary Examiner*—Bernard Lipman
*Attorney, Agent, or Firm*—Walter Katz; Marilyn J. Maue; Joshua J. Ward

[57] ABSTRACT

A process of making a mixed salt of a polymer containing an anhydride, acid or ester side groups therein which comprises:

(a) forming a reaction mixture of the polymer, mixed salt compounds and water, in a predetermined proportion, as a paste or slurry, (b) reacting and extruding the paste or slurry at a predetermined temperature to form the mixed salt of the polymer, and (c) drying the resultant reaction product.

12 Claims, No Drawings

REACTIVE EXTRUSION PROCESS FOR MAKING MIXED SALTS OF POLYMERS CONTAINING AN ANHYDRIDE, ACID OR ESTER SIDE GROUPS

BACKGROUND OF THE INVENTION

1. Field of the Invention

This invention relates to reactive extrusion, and, more particularly, to a continuous process for manufacturing mixed salts of polymers containing an anhydride, acid or ester side groups under reactive extrusion conditions.

2. Description of the Prior Art

Mixed salts of copolymers of maleic anhydride and methyl vinyl ether, for denture adhesive applications generally are made by batch process, a neutralization reaction, in a dilute aqueous solution of the copolymer and suitable mixed salt compounds. However, it is desired to provide an improved process for making such products, preferably in a continuous and rapid manner, and under high solids conditions.

SUMMARY OF THE INVENTION

A process of making a mixed salt of a polymer containing an anhydride, acid or ester side groups therein which comprises:

(a) forming a reaction mixture of the polymer, mixed salt compounds and water, in a predetermined proportion, as a paste or slurry, (b) reacting and extruding the paste or slurry at a predetermined temperature to form the mixed salt of the polymer, and (c) drying the resultant reaction product.

DETAILED DESCRIPTION OF THE INVENTION

In accordance with the invention, there is provided a process of making a mixed salt of a polymer containing an anhydride, acid or ester side groups therein which comprises:

(a) forming a reaction mixture of the polymer, mixed salt compounds and water, in a predetermined proportion, as a paste or a slurry, (b) reacting and extruding the paste or slurry at a predetermined temperature to form the mixed salt of the polymer, and (c) drying the resultant reaction product.

Suitable polymers for use herein include maleic anhydride or acid-alkyl vinyl ether copolymers; maleic anhydride or acid-acrylic or methacrylic acid copolymer; and esters thereof, terpolymers of these copolymers with an olefin monomer, and copolymers and terpolymers of the above wherein other monoethylenically unsaturated anhydrides or acids such as itaconic or itaconic anhydride or acids are substituted for maleic anhydride or acid.

The mixed salt reactant in the process of the invention contains metallic ions such as sodium, calcium, magnesium, manganese, potassium, ammonium, strontium, zinc, and aluminum, in desired mixed salt combination, such as Ca/Zn, Ca/Mg, Ca/Al, Na/Ca, Mg/Al, Mg/Ca and Fe/Ca, in compound form of the oxide, hydroxide, carbonate or alcoholate, etc. Typical compounds of the mixed salts include, e.g. calcium oxide or zinc oxide; calcium hydroxide, calcium carbonate or sodium hydroxide; or other non-toxic basic salt; and aluminum tri-isopropyl alcoholate. Although, typically the mixed salts comprise two cations, other higher combinations of metallic ions also may be used.

The reaction mixture thus comprises the polymer, mixed salt compounds, and water, blended into a paste in predetermined proportions, with sufficient water to effect the desired degree of hydrolysis of any anhydride or ester side groups present in the polymer.

The process of the invention is carried out in an extruder having a first section in which the reactants are blended, a second section which can be heated to a selected reaction temperature, and a third section in which water and residual solvent can be dried, preferably using vacuum. The desired reaction product then may be extruded into supplemental drying equipment, if necessary. Finally, the dried product may be powdered and sized.

A suitable extruder for use in the process of the invention is the Werner & Pfleiderer twin screw extruder, e.g. ZSK-30, however other extruders which meet the process requirements of the invention also can be used.

Preferred mixed salts product herein is the Ca/Na, Ca/Zn or Ca/Al mixed salt of maleic anhydridemethyl vinyl ether copolymer. For these products the process herein preferably is carried out in a continuous manner, at a solids content of about 20–80%, at a reaction temperature of about 40°–170° C. and devolatilization temperatures of about 90°–120° C.

EXAMPLE

In a 14-barrel ZSK-30 twin screw extruder, three feed streams were used, namely, one to feed methyl vinyl ether/ maleic anhydride copolymer (Gantrez® AN169BF; brand name of International Specialty Products), the second to feed a mixture of salt slurries and the third to add deionized water, if necessary. The Gantrez® AN169BF was fed to the first barrel, the salt slurry to the second and water to the third barrel. The first three barrels were maintained at 40°–60° C. and the screw design was such that the reaction mixing took place in this zone. The zone consisted of barrels 4–7 maintained at 90°–110° C. The drying and devolatalization zone consisted of barrels 8–14 which were maintained at 90°–100° C. under vacuum; it had three double length vents to facilitate the removal of water and residual toluene.

The Ca and Na hydroxides and carbonates were obtained commercially and were at least 99% pure. The screw speed was varied between 150–450 rpm, and the temperatures between 40°–170° C. in the reaction zone and 90°–110° C. in the drying and devolatalizing zones. Throughput rates were between 11–15 lb/hr and the solids content was around 50–60%.

The compounds made were the Na—Ca salt of Gantrez using sodium and calcium hydroxides as the salts. Approximately 200–300 g of product was collected for each run. Ca/Zn salts of Gantrez AN169BF have been made in a similar way.

In application as a denture adhesive, the free-flowing powder products herein, e.g. Na—Ca salts, were superior in performance to currently available commercial products, e.g. Gantrez® MS955, which is made in a batch reactor in aqueous solution.

While the invention has been described with particular reference to certain embodiments thereof, it will be understood that changes and modifications may be made which are within the skill of the art. Accordingly, it is intended to be bound only by the following claims, in which:

What is claimed is:

1. A process of making a mixed salt of a copolymer containing an anhydride group, therein which comprises:
   (a) forming a reaction mixture of the anhydride copolymer, mixed salt compounds and water, in a predetermined proportion, as a paste or a slurry,
   (b) reacting and extruding the paste or slurry at a predetermined temperature to form the mixed salt of the copolymer, and
   (c) drying the resultant reaction product.

2. A process according to claim 1 of making a mixed salt of maleic anhydride and methyl vinyl ether copolymer which comprises:
   (a) forming a reaction mixture of the anhydride copolymer, mixed salt compounds and water, at a predetermined proportion, as a paste or a slurry,
   (b) reacting and extruding the paste or slurry at about 40°–170° C. to form the mixed salt of said polymer, and
   (c) drying the resultant reaction product.

3. A process according to claim 1 wherein substantially all anhydride units of the copolymer are converted to the desired mixed salt.

4. A process according to claim 1 wherein the reaction mixture includes about 20–80% solids.

5. A process according to claim 1 wherein the mixed salts are selected from the group of sodium, calcium, magnesium, manganese, potassium, ammonium, zinc, aluminum and strontium.

6. A process according to claim 1 wherein the amount of water present in the reaction mixture is sufficient to hydrolyze an anhydride group of the copolymer.

7. A process according to claim 1 wherein the mixed salts are selected from the group of Ca/Zn, Ca/Mg, Ca/Al, Na/Ca, Mg/Al, Mn/Ca, Sr/Zn and Sr/Ca.

8. A process according to claim 4 wherein the solids content is 30–70%.

9. A process according to claim 1 wherein the mixed salts are present in the form of an oxide, hydroxide, carbonate or alcoholate.

10. A process according to claim 1 wherein the drying temperature is about 90°–120° C.

11. A process according to claim 1 wherein the mixed salts and water are present in predetermined amounts sufficient for forming mixed salts of the copolymer.

12. A process according to claim 1 which is carried out in a continuous manner by charging (a) into an extruder at a predetermined rate, and moving the reaction product out of the reactive stage of the extruder at a selected rate.

* * * * *